United States Patent
Marcou et al.

(10) Patent No.: US 6,818,824 B1
(45) Date of Patent: Nov. 16, 2004

(54) WIRING DEVICE GANGING TOOL

(75) Inventors: Jean Claude Marcou, Limoges (FR); Jim Knapik, Huntington, NY (US); Hua Qiang Shi, Shanghai (CN)

(73) Assignee: Cooper Wiring Devices, Inc., Long Island City, NY (US)

( * ) Notice: Subject to any disclaimer, the term of this patent is extended or adjusted under 35 U.S.C. 154(b) by 0 days.

(21) Appl. No.: 10/804,517

(22) Filed: Mar. 19, 2004

(51) Int. Cl.[7] .............................................. H05K 5/00
(52) U.S. Cl. .......................... 174/50; 174/53; 174/58; 174/57; 174/48; 174/135; 220/3.2; 220/3.3; 220/3.92; 220/3.94; 220/4.02; 33/174; 33/645; 33/DIG. 10; 33/370; 33/371; 33/347; 33/508; 33/451; 33/528
(58) Field of Search .............................. 174/50, 53, 58, 174/57, 48, 135; 220/3.2, 3.3, 3.92, 3.94, 4.02; 33/174, 645, DIG. 10, 370, 371, 347, 451, 528, 508

(56) References Cited

U.S. PATENT DOCUMENTS

| | | | |
|---|---|---|---|
| 3,279,080 A | 10/1966 | Stephinski | |
| 4,126,944 A | * 11/1978 | Burkhart | ...................... 33/347 |
| 4,750,271 A | 6/1988 | Ericksen | |
| D298,421 S | 11/1988 | Tyroff | |
| 4,793,069 A | 12/1988 | McDowell | |
| 4,888,880 A | 12/1989 | Parker | |
| 4,901,447 A | 2/1990 | Gottschalk | |
| 5,168,235 A | 12/1992 | Bonner | |
| 5,222,303 A | 6/1993 | Jardine | |
| 5,505,001 A | 4/1996 | Schaver, Jr. | |
| 5,507,098 A | 4/1996 | Schaver, Jr. | |
| 5,594,207 A | * 1/1997 | Fabian et al. | .................. 174/58 |
| 5,813,130 A | 9/1998 | MacDowell | |
| 6,003,234 A | * 12/1999 | Seibert | ......................... 33/371 |
| 6,209,214 B1 | * 4/2001 | Talavera | ....................... 33/528 |
| 6,434,848 B1 | 8/2002 | Gordon et al. | |
| 6,566,600 B1 | * 5/2003 | Ford et al. | ..................... 174/50 |

* cited by examiner

*Primary Examiner*—Chau N. Nguyen
*Assistant Examiner*—Anton Harris
(74) *Attorney, Agent, or Firm*—Ostrager Chong Flaherty & Broitman P.C.

(57) ABSTRACT

A ganging tool for adjusting the position of a pair of ganged wiring devices such as duplex receptacles, toggle, and decorator type switches on a mounting, e.g., an electrical box. The ganging tool has a frame having a pair of apertures for receiving different kinds of wiring devices and holding them in place while the ganging tool adjusts the position of the wiring devices. The ganging tool also has rotatable toggle adaptors that allow the ganging tool to be used to position both toggle type wiring devices and non-toggle type wiring devices. The ganging tool further has a leveling means for determining the level of the wiring devices. Also, tool cutouts on the frame of the ganging tool allow the ganging tool to be used with power tools in conjunction with positioning and affixing wiring devices on a mounting.

20 Claims, 5 Drawing Sheets

WIRING DEVICE GANGING TOOL

FIELD OF INVENTION

This invention relates to a tool for mounting electrical fixtures. More particularly, it relates to a ganging tool for adjusting the position and spacing of ganged wiring devices when installing these wiring devices onto mounting structures such as electrical boxes.

BACKGROUND OF INVENTION

Properly positioning wiring devices such as receptacles and switches when installing these devices onto a mounting (e.g., an electrical box) is a common problem facing electricians. The common method is to loosely affix the fasteners (e.g., screws) of the wiring device to the electrical box, adjust the position and level of the device by visual inspection and then permanently affix the device to the electrical box by tightening the screws. However, visual inspection is rarely accurate and the electrician generally has to loosen and re-adjust the positioning of the wiring device several times to get it right. Alternatively, the electrician can adjust the level of the device by using a leveling device that is commonly known as a torpedo level. However, holding the torpedo level to determine the level of the wiring device while at the same time trying to adjust the position of the wiring device is difficult. The problem of positioning a wiring device increases when two or more wiring devices are placed together side-by-side (i.e., "ganged") in a mounting such as an electrical box. In such a case the electrician not only has the problem of positioning each wiring device but also has the problem of adjusting the position and spacing of each wiring device vis-à-vis the other devices.

Information relevant to attempts to solve the foregoing problems can be found in U.S. Pat. Nos. 3,279,080; 5,168,235; 4,888,880 and 6,003,234. However, each of the solutions disclosed in these patents has a problem in utilization that makes it relatively unattractive to manufacture and/or use. For example, the gang outlet template disclosed in U.S. Pat. No. 3,279,080 to Stepshinski is limited to adjusting the position of either ganged toggle type switches or ganged duplex electrical receptacles. It cannot be used for ganged combinations of different wiring devices. Nor can it be used with decorator type switches or GFCI type receptacles. Further, the gang outlet template is clumsy and dangerous to carry due to pointed dowel pins that project from one of its surfaces. The tool disclosed in U.S. Pat. No. 5,168,235 to Bonner can only be used to adjust a receptacle. Further, said tool is bulky and difficult to carry around a job site because of prongs that project from its surface. Moreover, it incorporates a diagnostic device for testing receptacles thereby making it expensive to manufacture. The electrician's level disclosed in U.S. Pat. No. 4,888,880 to Parker cannot be used with GFCI receptacles or decorator type switches. Moreover, it requires a user to install removable screws every time the user needs to position a receptacle and, as such, makes said level clumsy to use. Moreover, the removable screws are easy to lose on a job site. The receptacle level disclosed in U.S. Pat. No. 6,003,234 to Seibert can be used only for leveling electrical receptacles. Similarly, the switch level disclosed in U.S. Pat. No. 5,505,001 to Schaver is limited to leveling toggle type switches.

Accordingly, it is a broad object of the invention to provide a compact, handy, easy to use and inexpensive tool that allows the user to adjust the position of not only a single wiring device but also the position of ganged wiring devices that consist of combinations of different types of wiring devices such as toggle type switches, duplex receptacles, GFCI receptacles, and decorator type switches.

SUMMARY OF INVENTION

In the present invention, the foregoing purposes, as well as others that will be apparent, are achieved generally by providing a ganging tool that is suitable for properly adjusting the position of a pair of ganged wiring devices on a mounting such as an electrical box. The ganging tool has a frame comprised of a top member, a bottom member, a left member, and a right member. A center member extends from a central portion of the bottom member to a central portion of the top member. This creates a first and second device aperture. Each device aperture is "dimensioned" (i.e., sized, shaped, constructed, adapted and arranged) to accommodate different kinds of wiring devices. The ganging tool also has a rotatable toggle adaptor disposed horizontally across each device aperture. The toggle adaptor has a first position that allows the device aperture to accommodate a toggle type wiring device and a second position that allows the device aperture to accommodate a non-toggle type wiring device. Also, while the preferred embodiment of the present invention has two device apertures, alternate embodiments can have three or more device apertures so as to allow the ganging tool to adjust the positioning of three or more ganged wiring devices.

The ganging tool also has a leveling means (e.g., a bubble type level) for determining the level of the ganging tool. A further feature of the present invention is the presence of opposing pairs of tool cutouts on the frame that are respectively disposed to a top and bottom of a directly adjacent device aperture. These tool cutouts allow the ganging tool to be used with power tools.

The advantage of the present invention is it can be used to position ganged combinations of different kinds of wiring devices. In addition, the ganging tool is easy to use and relatively simple to manufacture. Further, the ganging tool is small, compact and easy to carry around a job site. Also, by properly positioning wiring devices, the ganging tool makes it easier to place wall plates over said wiring devices. Other objects, features and advantages of the present invention will become apparent when the detailed description of the preferred embodiments of the invention are considered in conjunction with the drawings which should be construed in an illustrative and not limiting sense as follows.

DESCRIPTION OF PREFERRED EMBODIMENTS

Figure 1A:
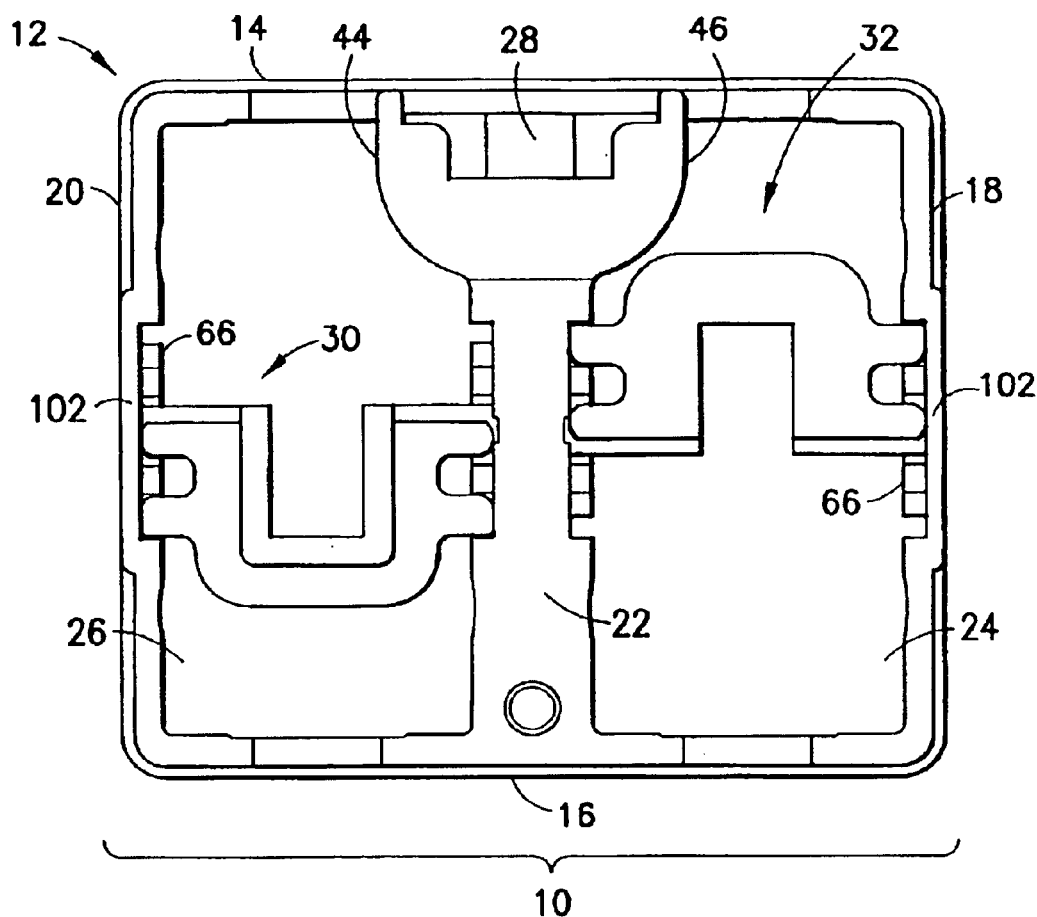
FIG. 1A is a plan frontal view of a ganging tool embodying features of the present invention.
Figure 1B:
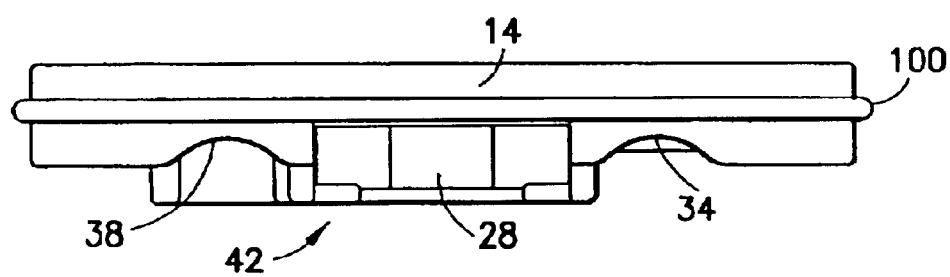
FIG. 1B is a plan top view of the ganging tool of FIG. 1A.
Figure 1C:
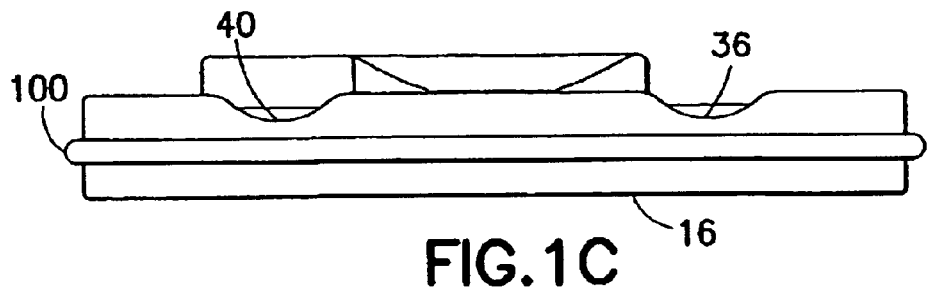
FIG. 1C is a plan bottom view of the ganging tool of FIG. 1A.
Figure 1D:
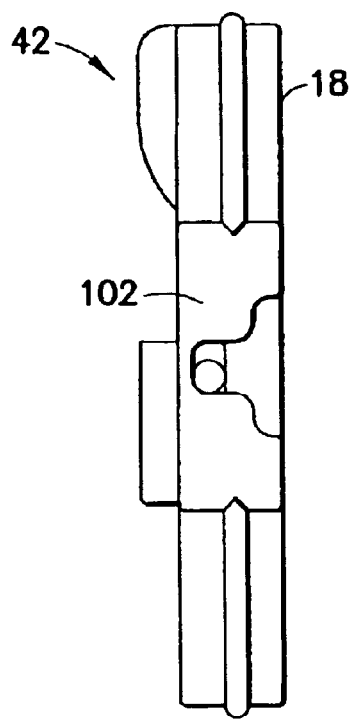
FIG. 1D is a plan view of the left side of the ganging tool of FIG. 1A.
Figure 1E:
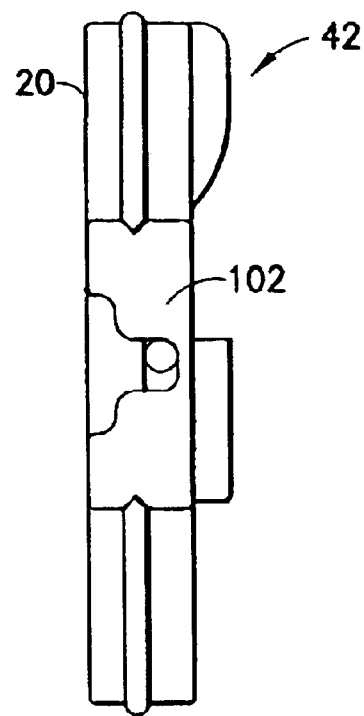
FIG. 1E is a plan view of the right side of the ganging tool of FIG. 1A

As seen in FIG. 1A, a ganging tool 10 in accordance with one embodiment of the present invention comprises a frame 12, a center member 22, a first device aperture 24, a second device aperture 26, a leveling means such as a bubble level 28 (see, FIG. 2) and a pair of toggle adaptors (30, 32). The ganging tool is made from materials suitable for use with wiring devices (e.g., plastic, composites) and is fabricated by conventional methods (e.g., molding, machining). As used herein, the term "wiring devices" refers to duplex receptacles, decorator type switches, toggle type switches, GFCI receptacles and such other wiring devices commonly used in the electrical industry that have a configuration, size and shape similar to the aforementioned wiring devices such that the present invention is suitable for use in adjusting the positioning of said other wiring devices.

The ganging tool 10 is customarily used in a vertical or upright position (see, FIGS. 1A and 4A-C) since wiring devices are generally oriented vertically with respect to a mounting (e.g., electrical box) to which the devices are attached. Based on the foregoing, the terms top, bottom, upper, lower, inner, outer, front, rear, left and right, as used herein with respect to the ganging tool are to be understood in the context of the ganging tool being in an upright or vertical position as shown in FIG. 1A. However, it is to be understood that the ganging tool may also be used in the horizontal position if the mounting position of the wiring device so requires.

In the embodiment shown in FIG. 1A, the frame 12 is generally rectangular shaped and is dimensioned to allow the frame to be used for positioning a pair of ganged wiring devices. However, a frame having other suitable shapes (e.g., square) is within the spirit of the present invention. In the embodiment shown in FIG. 1A the frame 12 has a height of about 3 inches and a width of about 3⅕ inches. The frame 12 comprises a top member 14, a bottom member 16, a left member 18, and a right member 20. The top and bottom members 14, 16 are disposed parallel to each other and perpendicular to the left and right members 18, 20. The left and right members 18, 20 are disposed parallel to each other and perpendicular to the top and bottom members 14, 16. Preferably, the top, bottom, left and right members have a generally rectangular cross-section. However, other suitable cross-sectional shapes (e.g., square shaped) are within the spirit of the present invention.

In the embodiment shown in FIG. 1A, part of an outer surface of the frame has been partially cut away or recessed so as to leave only a narrow rib 100 running around the outer surface of the frame and a small rectangular shaped support structure 102 disposed on the outer surface of the left and right side of the frame (see, FIGS. 1B to 1E) Removing or recessing part of the outer surface of the frame makes the frame smaller, lighter and, therefore, more handy and compact while the rib and rectangular structures ensure that the frame still has sufficient strength and stiffness to make it durable.

The center member 22 extends from a central portion of the bottom member 16 to a central portion of the top member 14. The center member is disposed parallel to the left and right members 18, 20 and perpendicular to the top and bottom members 14, 15. In the embodiment shown in FIG. 1A, the cross-section of the center member is generally U-shaped wherein the bottom or curve of the "U" shape faces forwards and the ends or arms of the "U" shape are directed rearwards. However, other suitable cross-sectional shapes (e.g., a hollow rectangular or square-shape) are within the spirit of the present invention.

Figure 1F:
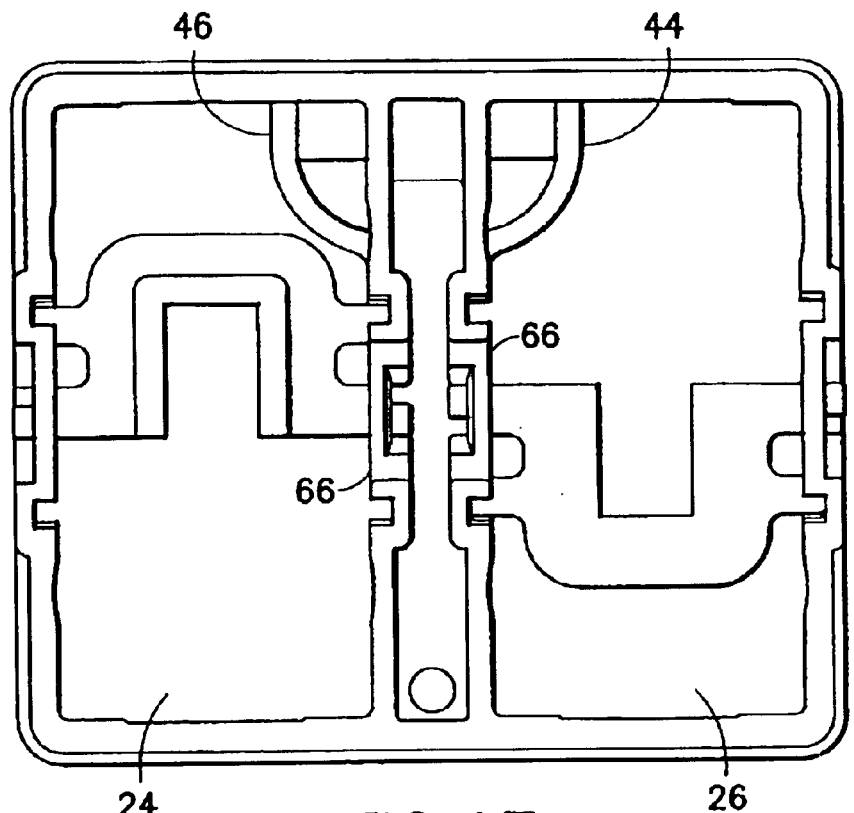
FIG. 1F is a plan rear view of the ganging tool of FIG. 1A.

Referring to FIGS. 1A and 1F, the center member 22 configures a first device aperture 24 and a second device aperture 26. That is, the center member 22, left member 18, a left end of the top member 14 and a left end of the bottom member 16 define the first device aperture 24 while the right member 20, a right end of the top member 14, a right end of the bottom member 16 and the center member 22 define the second device aperture 26. The device aperture is generally rectangular shaped. Further, each device aperture is dimensioned to accommodate (i.e., accept and hold in place) wiring devices so as to allow the user to manipulate the ganging tool in order to position the wiring device. As the term is used herein, positioning the wiring device includes ensuring that the device is level and, in the case of ganged devices, that the wiring device is properly spaced and aligned with the other wiring device to which it is ganged.

The rotatable toggle adaptors 30, 32 are disposed horizontally across each device aperture 24, 26 (see, FIGS. 1A and 1F). Each toggle adaptor has a first position to allow the device aperture to accommodate a toggle type wiring device and a second position to allow the device aperture to accommodate a non-toggle type wiring device. These two positions can be seen in FIGS. 1A, 1F, and 4B, which show toggle adaptor 32 in the first position and toggle adaptor 30 in the second position.

Figure 2:
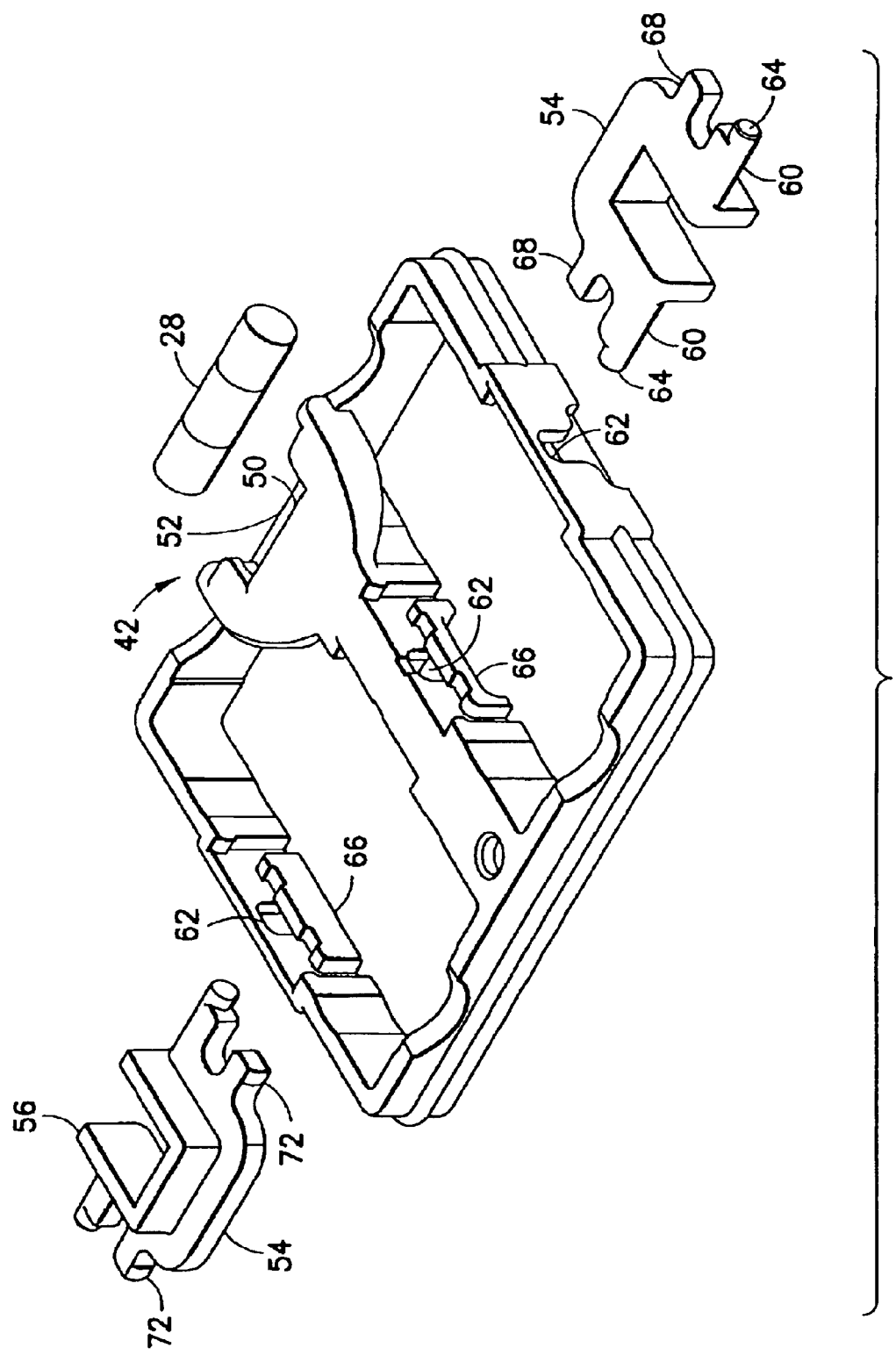
FIG. 2 is an exploded perspective view of the ganging tool of FIG. 1A.
Figure 3A:
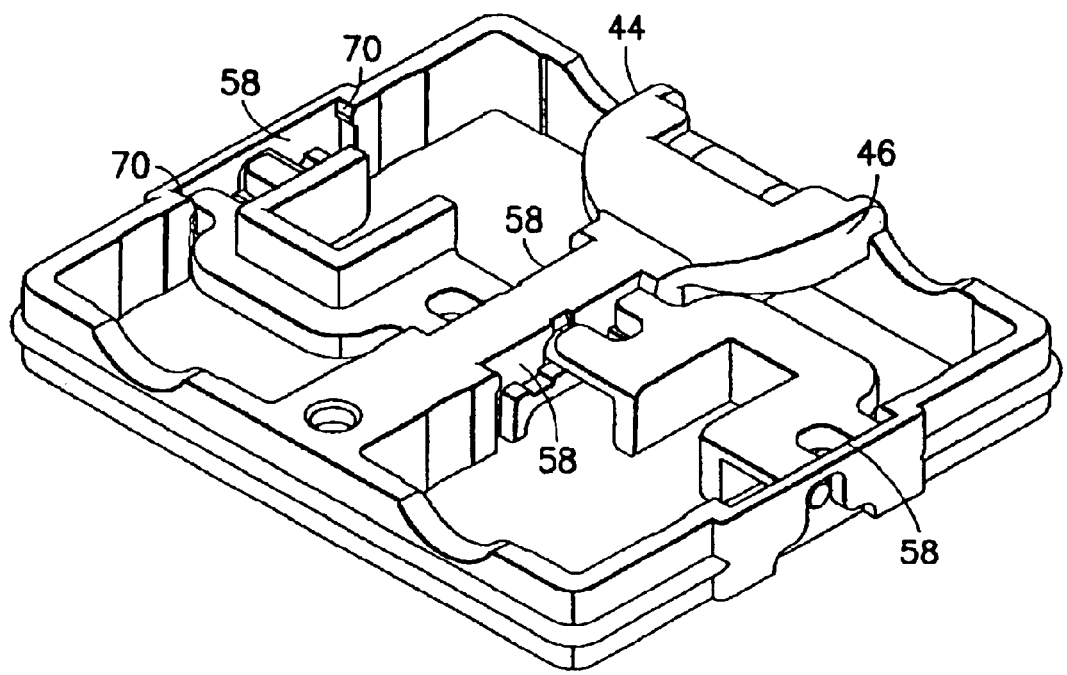
FIG. 3A is a front perspective view of the ganging tool of FIG. 1A.
Figure 4C:
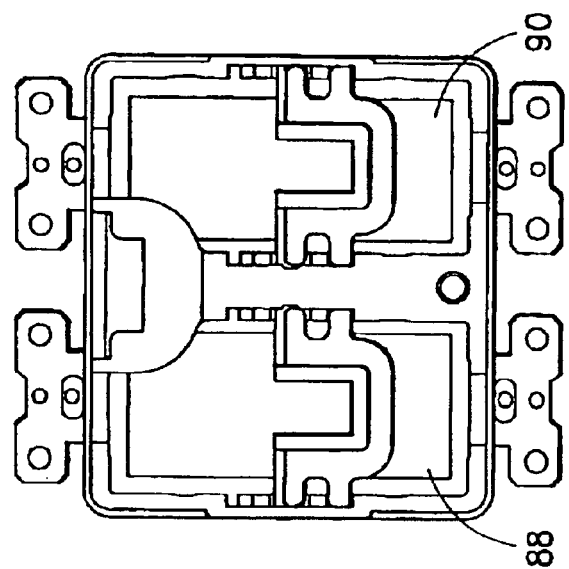
FIG. 4C is a front perspective view of the ganging tool of FIG. 1A in use with a pair of ganged decorator type switches.
Figure 4B:
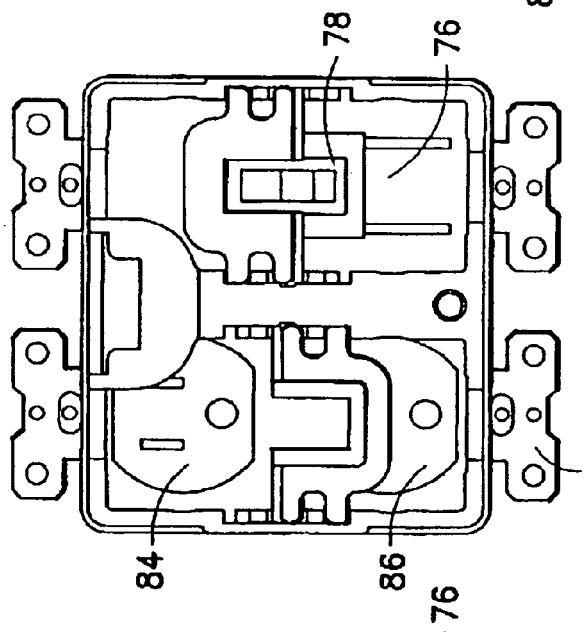
FIG. 4B is a front perspective view of the ganging tool of FIG. 1A in use with a ganged duplex receptacle and toggle switch.
Figure 4A:
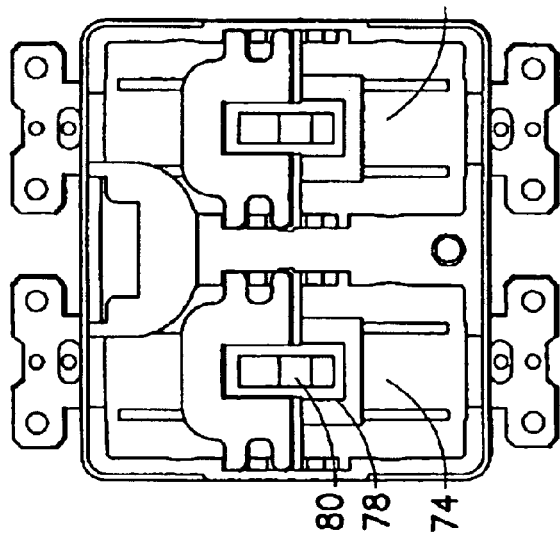
FIG. 4A is a front perspective view of the ganging tool of FIG. 1A in use with a pair of ganged toggle switches.

Referring to FIG. 2, the toggle adaptor comprises a U-shaped planar toggle body 54 having a front and rear surface. As shown in FIGS. 1A and 1F, the toggle body is disposed perpendicular to the top member 14 and bottom member 16 and parallel to the center member 22 and left and right members 18, 20 (i.e., the arms or ends of the toggle body are perpendicular to the top and bottom members and parallel to the center, left and right members). A flange 56 extends perpendicular to the rear surface of the toggle body and runs along an interior edge of the toggle body 54. Referring to FIGS. 4A and 4B, the toggle body 54 and flange 56 are dimensioned to accommodate a toggle 80 and bezel 78 of a toggle-type wiring device 74, 76. As shown in FIGS. 1A and 3A, when the toggle adapter is in the first position (in this case toggle adapter 32), the flange 56 extends rearwards and the rear surface of the toggle body is directly adjacent to a front surface of the wiring device. When the toggle adapter is in the second position (in this case toggle adapter 30) the flange 56 extends forwards and the front surface of the toggle body is directly adjacent to the front surface of the wiring device.

Figure 3B:
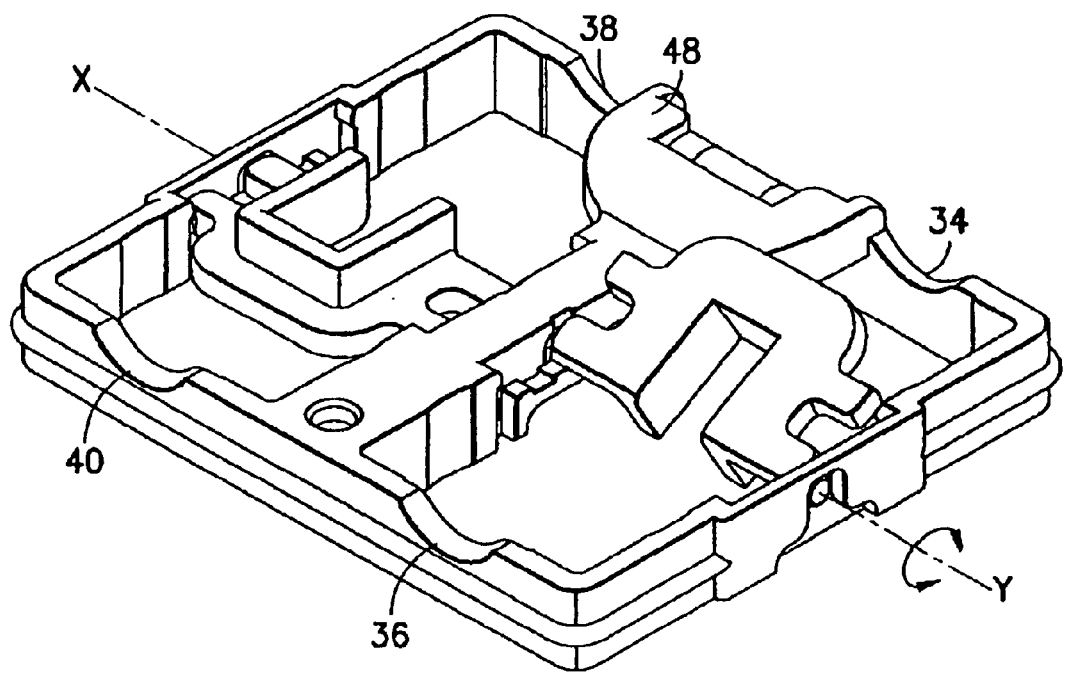
FIG. 3B is a front perspective view of the ganging tool of FIG. 1A with a toggle adaptor partially raised.

The ganging tool 10 has a toggle adaptor mounting assembly for rotatably mounting the toggle body 54 to the adjacent vertical members, that is, the center member 22 and the left member 18 and/or right member 20 as the case may be. See, FIG. 1A. Referring to FIGS. 2 and 3A-3B, the mounting assembly comprises a mounting notch 58 disposed on each inner surface of the left member 18, right member 20 and center member 22. Each mounting notch 58 is positioned so that it lies adjacent to the end of an immediately adjacent toggle body. A mounting arm 60 extends perpendicularly from an exterior edge of each end of the toggle body into an immediately adjacent mounting notch. Thus, each toggle body 54 has a pair of mounting arms 60 projecting into horizontally opposing mounting notches 58. A mounting hole 62 is disposed on an inner surface of each mounting notch 58. The mounting hole is positioned so that it is in line with an immediately adjacent mounting arm. A mounting pin 64 projects from an end of each mounting arm 60 and into an immediately adjacent mounting hole 62. As seen in FIG. 3B, the mounting pins and mounting holes are dimensioned so that they coact with each other so as to allow the toggle adaptor to rotate about the axis x-y.

The ganging tool preferably includes a stop mechanism for limiting the rotational travel of the toggle adapter so as to prevent the toggle adapter from rotating rearwards behind the ganging tool (i.e., rotating behind the ganging too). Referring to FIGS. 1A, 1F, 2 and 3A-3B, the stop mechanism comprises a stop ledge 66 that is disposed on the inner surface of each mounting notch 58. The ledge is positioned so that it lies below (i.e., to the rear) of the mounting hole 62. In addition, an inner surface of the ledge is co-planar with an inner surface of the immediately adjacent member (i.e., the left, right or center member as the case may be). The stop mechanism further comprises a stop arm 68 disposed parallel to and at a distance away from each mounting arm 60. The stop arm 68 extends from the exterior edge of the toggle body and into the immediately adjacent mounting notch 58. Thus, each toggle body 54 has a pair of stop arms projecting into horizontally opposing mounting notches. As shown in FIGS. 1A and 3A, the stop arm 68 and ledge 66 are dimensioned so that a tip of each stop arm 68 rests on a front surface of one end of an immediately adjacent stop ledge 66 when the toggle adaptor is in the first position (i.e., toggle adaptor 32 in FIGS. 1A and 3A) and the tip rests on the front surface of the opposite end of the immediately adjacent stop ledge 66 when the toggle adapter is in the second position (i.e., toggle adaptor 30 in FIGS. 1A and 3A).

Preferably, the ganging tool has a holding mechanism for holding the toggle adapter in place when the toggle adapter is in the first and second position. Referring to FIGS. 2 and 3A-3B, the holding mechanism comprises a small protrusion or frame stop 70 positioned on each inside corner of each mounting notch 58. The stop 70 is disposed adjacent to and co-planar with a front surface of an immediately adjacent member (i.e., the left, right or center member as the case may be). Thus, each mounting notch 58 has a pair of vertically opposing frame stops. The holder mechanism further comprises a small protrusion or toggle stop 72 projecting from an exterior edge of each stop arm (i.e., the edge of the stop arm 68 that is facing away from the immediately adjacent mounting arm 60) and disposed immediately adjacent to the tip of the stop arm. The frame stop 70 and toggle stop 72 are dimensioned so that the toggle stop 72 snaps over frame stop 70 and is held in place by the frame stop. Thus, when the toggle adapter is in the first position, the toggle stop 72 snaps over and is held in place by the first frame stop 70 of the pair of opposing frame stops (see, e.g., toggle 32 in FIGS. 1A and 3A) and when the toggle adapter is rotated into the second position, then, the toggle stop snaps over and is held in place by the second frame stop of the opposing pair of frame stops.

In a preferred embodiment of the invention, the ganging tool further comprises a leveling means for determining the level of the ganging tool. The leveling means is preferably a bubble level 28 of the type commonly used in construction work for determining level (see, FIG. 2). However, other suitable types of leveling means (e.g., a laser level) may be used. As shown in FIGS 1A-1E, 2, 3A-3B, the bubble level 28 is mounted in a level mounting 42. The level mounting 42 is disposed on a front surface of the ganging tool at a location where the center member 22 and top member 14 meet (i.e., the location where the top and center member join together). The level mounting 42 comprises a generally semi-circular shaped holder 48 having a curved surface that extends from a front surface of the center member 22 to a point just below the top member. A pair of opposing holder arms 44, 46 are disposed perpendicular to the holder 48. The holder arms 44, 46 run along side edges of the holder and extend partially into the top member 14. The holder 48 and opposing holder arms form a slot 52. The bubble level 28 snap fits into the slot so that it lies parallel to the top member 16 and perpendicular to the center member 22. A window notch 50 disposed along the upper edge of the holder 48 enables the bubble level to be viewed.

The ganging tool preferably has tool cutouts that are dimensioned to fit a power tool. See FIGS. 2, 3A-3B. As used herein, the term "fit" means that the tool cutouts are dimensioned to allow the ganging tool to be used in conjunction with a power tool in positioning, mounting and fastening wiring devices. Preferably, a first pair of opposing tool cutouts 34, 36 is respectively disposed on a front surface of the left end of the top member 14 and a front surface of a left end of the bottom member 16 and a second pair of opposing tool cutouts 38, 40 is respectively disposed on a front surface of the right end of the top member 14 and a front surface of the right end of the bottom member 16. Thus, each device aperture 24, 26 has a pair of opposing tool cutouts wherein the tool cutouts are disposed respectively adjacent to the top and bottom of the device aperture.

The ganging tool is used to position ganged wiring devices as follows. The devices are loosely affixed to the mounting, (e.g. an electrical box) with the appropriate fasteners (e.g., mounting screws). The toggle adapters are then positioned to match the wiring devices. Specifically, the appropriate toggle adapter is lifted out of its present position, that is, the first or second position as the case may be (see, e.g., toggle adapter 32 in FIG. 3B), rotated and into place into the required position. For example, if toggle adaptors 30, 32 are in the positions shown in FIG. 1A, then, in order to use the ganging tool to position a pair of ganged toggle type switches 74, 76 (see, FIG. 4A), the user must lift toggle adaptor 30 out of its present position (in this case, the second position) and rotate toggle adaptor 30 into place into the desired position (in this case, the first position). The ganging tool is then placed over the toggle switches so that the toggles 80 and bezels 78 are accommodated into both toggle adaptors 30, 32. The ganging tool is then manipulated until the toggle switches 74, 76 are properly positioned and the mounting screws are tightened so as to fix the switches 74, 76 into the final position. In order to later use the ganging tool for other combinations of ganged devices (see, e.g., FIGS. 4B-4C), the user merely has to rotate the appropriate toggle adapter into the desired position and repeat the process described above.

In an alternate embodiment (not shown), instead of a single center member, the ganging tool has two, parallel spaced-apart center members (i.e., a left and right center member) that extend from the bottom member to the top member. These two center members configure a first, second and third device aperture. That is, the left center member, left member, a left end of the top member and a left end of the bottom member define a left side device aperture; the right member, a right end of the top member, a right end of the bottom member and the right center member define a right side device aperture; and the left center member, right center member, a central portion of the top member and a center portion of the bottom member define a center device aperture. In a further alternate embodiment (not shown), the ganging tool may have three or more center members that configure four or more device apertures. Nevertheless, apart from having more than two device apertures, the foregoing alternate embodiments of the present invention are otherwise similar to the embodiments previously discussed above. That is, these alternate embodiments also have toggle adapters, leveling means, tool cutouts and other features previously discussed above. However, by having three or more device apertures, these alternate embodiments allow a user to position three or more wiring devices that have been ganged together.

Although the invention has been described with reference to preferred embodiments, it will be appreciated by one of ordinary skill in the art that numerous modifications are possible in light of the above disclosure. For example, as discussed above, the ganging tool may have three or more device apertures. In addition, the ganging tool or its components may have rounded edges and corners to make the ganging tool more ergonomic. Also, useful tools such a ruler, wire gauge, wire stripper or additional leveling means may be inscribed on, mounted on or attached to the frame. All such variations and modifications are intended to be within the scope and spirit of the invention.

What is claimed is:

1. A ganging tool suitable for adjusting the position of a pair of ganged wiring devices, the ganging tool comprising:
    a frame comprising a top member, a bottom member, a left member, and a right member;
    a center member extending from a central portion of the bottom member to a central portion of the top member, wherein the center member configures a first and second device aperture and further, wherein each device aperture is dimensioned to accommodate wiring devices;
    a leveling means for determining the level of the ganging tool; and
    a rotatable toggle adaptor disposed horizontally across each device aperture, wherein each toggle adaptor has a first position to allow the device aperture to accommodate a toggle type wiring device and a second position to allow the device aperture to accommodate a non-toggle type wiring device.

2. The ganging tool of claim 1, further comprising:
    a first pair of opposing tool cutouts respectively disposed on a front surface of a left end of the top member and a front surface of a left end of the bottom member; and
    a second pair of opposing tool cutouts respectively disposed on a front surface of a right end of the top member and a front surface of a right end of the bottom member, wherein the tool cutouts are dimensioned to fit a power tool.

3. The ganging tool of claim 1, wherein the leveling means is a bubble level.

4. The ganging tool of claim 3, further comprising a level mounting for holding the bubble level, wherein the level mounting is disposed on a front surface of the ganging tool at a location where the center member and top member meet, the level mounting comprising:
    a holder extending from a front surface of the center member to a point below the top member;
    a window notch disposed along an upper edge of the holder; and
    a pair of opposing holder arms disposed perpendicular to the holder and running along side edges of the holder and extending partially into the top member, wherein the holder and holder arms form a slot for holding the bubble level.

5. The ganging tool of claim 1, wherein the toggle adaptor comprises:
    a U-shaped planar toggle body having a front and rear surface, the toggle body being disposed perpendicular to the top and bottom member and parallel to the center, left and right members; and
    a flange extending perpendicular to the rear surface of the toggle body and running along an interior edge of the toggle body, wherein the toggle body and flange are dimensioned to accommodate a toggle and bezel of a toggle-type wiring device, wherein when the toggle adapter is in the first position the flange extends rearwards and the rear surface of the toggle body is directly adjacent to a front surface of the wiring device and when the toggle adapter is in the second position the flange extends forwards and the front surface of the toggle body is directly adjacent to the front surface of the wiring device.

6. The ganging tool of claim 5, further comprising a toggle adaptor mounting assembly comprising:
    a mounting notch disposed on each inner surface of the left, right and center members and positioned adjacent to an end of an immediately adjacent toggle body;
    a mounting arm extending perpendicularly from an exterior edge of each end of the toggle body into an immediately adjacent mounting notch;
    a mounting hole disposed on an inner surface of each mounting notch, wherein each mounting hole is positioned in line with an immediately adjacent mounting arm; and
    a mounting pin projecting from an end of each mounting arm into an immediately adjacent mounting hole.

7. The ganging tool of claim 6, further comprising a stop mechanism for limiting the rotational travel of the toggle adapter, the stop mechanism comprising:
    a stop ledge disposed on the inner surface of each mounting notch and positioned below the mounting hole, wherein an inner surface of the stop ledge is co-planar with the inner surface of an immediately adjacent member; and
    a stop arm disposed parallel to and at a distance away from each mounting arm, wherein the stop arm extends from the exterior edge of the toggle body and into the immediately adjacent mounting notch and further, wherein a tip of the stop arm rests on a front surface of one end of an immediately adjacent stop ledge when the toggle adaptor is in the first position and the tip rests on the front surface of the opposite end of the immediately adjacent stop ledge when the toggle adaptor is in the second position.

8. The ganging tool of claim 7, further comprising a holding mechanism for holding the toggle adapter in place when the toggle adapter is in the first and second position, the holding mechanism comprising:
    a frame stop positioned on each inside corner of each mounting notch adjacent to and co-planar with a front surface of an immediately adjacent member; and
    a toggle stop projecting from an exterior edge of each stop arm and disposed immediately adjacent to the tip of the stop arm, wherein the frame stop and toggle stop are dimensioned so that the toggle stop snap fits over the frame stop.

9. A ganging tool suitable for adjusting the position of three ganged wiring devices, the ganging tool comprising:

a frame comprising a top member, a bottom member, a left member, and a right member;

two parallel spaced-apart center members extending from the bottom member to the top member, wherein the center members configure a left, center and right device aperture, wherein each device aperture is dimensioned to accommodate wiring devices;

a leveling means for determining the level of the ganging tool; and a rotatable toggle adaptor disposed horizontally across each device aperture, wherein each toggle adaptor has a first position to allow the device aperture to accommodate a toggle type wiring device and a second position to allow the device aperture to accommodate a non-toggle type wiring device.

10. The ganging tool of claim 9, further comprising:

a first pair of opposing tool cutouts respectively disposed on a front surface of a left end of the top member and a front surface of a left end of the bottom member, wherein the first pair of opposing tool cutouts are respectively directly adjacent to a top and bottom of the left device aperture;

a second pair of opposing tool cutouts respectively disposed on a front surface of a center portion of the top member and a front surface of a center portion of the bottom member, wherein the second pair of opposing tool cutouts are respectively directly adjacent to a top and bottom of the center device aperture; and a third pair of opposing tool cutouts respectively disposed on a front surface of a right end of the top member and a front surface of a right end of the bottom member, wherein the third pair of opposing tool cutouts are respectively directly adjacent to the right device aperture and further, wherein the tool cutouts are dimensioned to fit a power tool.

11. The ganging tool of claim 9, wherein the leveling means is a bubble level.

12. The ganging tool of claim 9, wherein the toggle adaptor comprises:

a U-shaped planar toggle body having a front and rear surface, the toggle body being disposed perpendicular to the top and bottom member and parallel to the center, left and right members; and a flange extending perpendicular to the rear surface of the toggle body and running along an interior edge of the toggle body, wherein the toggle body and flange are dimensioned to accommodate a toggle and bezel of a toggle-type wiring device, wherein when the toggle adapter is in the first position the flange extends rearwards and the rear surface of the toggle body is directly adjacent to a front surface of the wiring device and when the toggle adapter is in the second position the flange extends forwards and the front surface of the toggle body is directly adjacent to the front surface of the wiring device.

13. The ganging tool of claim 12, further comprising a toggle adaptor mounting assembly comprising:

a mounting notch disposed on each inner surface of the left, right and center members and positioned adjacent to an end of an immediately adjacent toggle body;

a mounting arm extending perpendicularly from an exterior edge of each end of the toggle body into an immediately adjacent mounting notch;

a mounting hole disposed on an inner surface of each mounting notch, wherein each mounting hole is positioned in line with an immediately adjacent mounting arm; and a mounting pin projecting from an end of each mounting arm into an immediately adjacent mounting hole.

14. The ganging tool of claim 13, further comprising a stop mechanism for limiting the rotational travel of the toggle adapter, the stop mechanism comprising:

a stop ledge disposed on the inner surface of each mounting notch and positioned below the mounting hole, wherein an inner surface of the stop ledge is co-planar with the inner surface of the immediately adjacent member; and a stop arm disposed parallel to and at a distance away from each mounting arm, wherein the stop arm extends from the exterior edge of the toggle body and into the immediately adjacent mounting notch and further, wherein a tip of the stop arm rests on a front surface of one end of an immediately adjacent stop ledge when the toggle adaptor is in the first position and the tip rests on the front surface of the opposite end of the immediately adjacent stop ledge when the toggle adaptor is in the second position.

15. The ganging tool of claim 14, further comprising a holding mechanism for holding the toggle adapter in place when the toggle adapter is in the first and second position, the holding mechanism comprising:

a frame stop positioned on each inside corner of each mounting notch adjacent to and co-planar with a front surface of an immediately adjacent member; and a toggle stop projecting from an exterior edge of each stop arm and disposed immediately adjacent to the tip of the stop arm, wherein the frame stop and toggle stop are dimensioned so that the toggle stop snap fits over the frame stop.

16. A ganging tool suitable for adjusting the position of a pair of ganged wiring devices, the ganging tool comprising:

a frame comprising a top member, a bottom member, a left member, and a right member;

a center member extending from a central portion of the bottom member to a central portion of the top member, wherein the center member configures a first and second device aperture and further, wherein each device aperture is dimensioned to accommodate wiring devices; and a rotatable toggle adaptor disposed horizontally across each device aperture, wherein each toggle adaptor has a first position to allow the device aperture to accommodate a toggle type wiring device and a second position to allow the device aperture to accommodate a non-toggle type wiring device.

17. The ganging tool of claim 16, further comprising:

a first pair of opposing tool cutouts respectively disposed on a front surface of a left end of the top member and a front surface of a left end of the bottom member; and a second pair of opposing tool cutouts respectively disposed on a front surface of a right end of the top member and a front surface of a right end of the bottom member, wherein the tool cutouts are dimensioned to fit a power tool.

18. The ganging tool of claim 16, further comprising a leveling means for determining the level of the ganging tool.

19. The ganging tool of claim 16, wherein the toggle adaptor comprises:

a U-shaped planar toggle body having a front and rear surface, the toggle body being disposed perpendicular to the top and bottom member and parallel to the center, left and right members; and a flange extending perpendicular to the rear surface of the toggle body and running along an interior edge of the toggle body, wherein the toggle body and flange are dimensioned to accommodate a toggle and bezel of a toggle-type wiring device, wherein when the toggle adapter is in the first position the flange extends rearwards and the rear surface of the toggle body is directly adjacent to a front surface of the wiring device and when the toggle adapter is in the second position the flange extends forwards and the front surface of the toggle body is directly adjacent to the front surface of the wiring device.

20. The ganging tool of claim 19, further comprising:

(a) a toggle adaptor mounting assembly comprising:
   a mounting notch disposed on each inner surface of the left, right and center members and positioned adjacent to an end of an immediately adjacent toggle body;
   a mounting arm extending perpendicularly from an exterior edge of each end of the toggle body into an immediately adjacent mounting notch;
   a mounting hole disposed on an inner surface of each mounting notch, wherein each mounting hole is positioned in line with an immediately adjacent mounting arm; and
   a mounting pin projecting from an end of each mounting arm into an immediately adjacent mounting hole;

(b) a stop mechanism for limiting the rotational travel of the toggle adapter, the stop mechanism comprising:
   a stop ledge disposed on the inner surface of each mounting notch and positioned below the mounting hole, wherein an inner surface of the stop ledge is co-planar with the inner surface of an immediately adjacent member; and
   a stop arm disposed parallel to and at a distance away from each mounting arm, wherein the stop arm extends from the exterior edge of the toggle body and into the immediately adjacent mounting notch and further, wherein a tip of the stop arm rests on a front surface of one end of an immediately adjacent stop ledge when the toggle adaptor is in the first position and the tip rests on the front surface of the opposite end of the immediately adjacent stop ledge when the toggle adaptor is in the second position; and (c) a holding mechanism for holding the toggle adapter in place when the toggle adapter is in the first and second position, the holding mechanism comprising:
   a frame stop positioned on each inside corner of each mounting notch adjacent to and co-planar with a front surface of an immediately adjacent member; and
   a toggle stop projecting from an exterior edge of each stop arm and disposed immediately adjacent to the tip of the stop arm, wherein the frame stop and toggle stop are dimensioned so that the toggle stop snap fits over the frame stop.

* * * * *